No. 823,652. PATENTED JUNE 19, 1906.
L. E. WATERMAN.
RIDING ATTACHMENT FOR HARROWS.
APPLICATION FILED JAN. 4, 1906.

Witnesses:
H. J. Slagle
E. Behel

Inventor:
Lewis E. Waterman.
By A. O. Behel
Atty.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

RIDING ATTACHMENT FOR HARROWS.

No. 823,652.     Specification of Letters Patent.     Patented June 19, 1906.

Application filed January 4, 1906. Serial No. 294,640.

*To all whom it may concern:*

Be it known that I, LEWIS E. WATERMAN, a citizen of the United States, residing at Rockford, in the county of Winnebago and State of Illinois, have invented certain new and useful Improvements in Riding Attachments for Harrows, of which the following is a specification.

The object of this invention is to provide a riding attachment for harrows in which the wheels are permitted to caster and the weight of the driver tending to hold them from turning.

Figure 1:
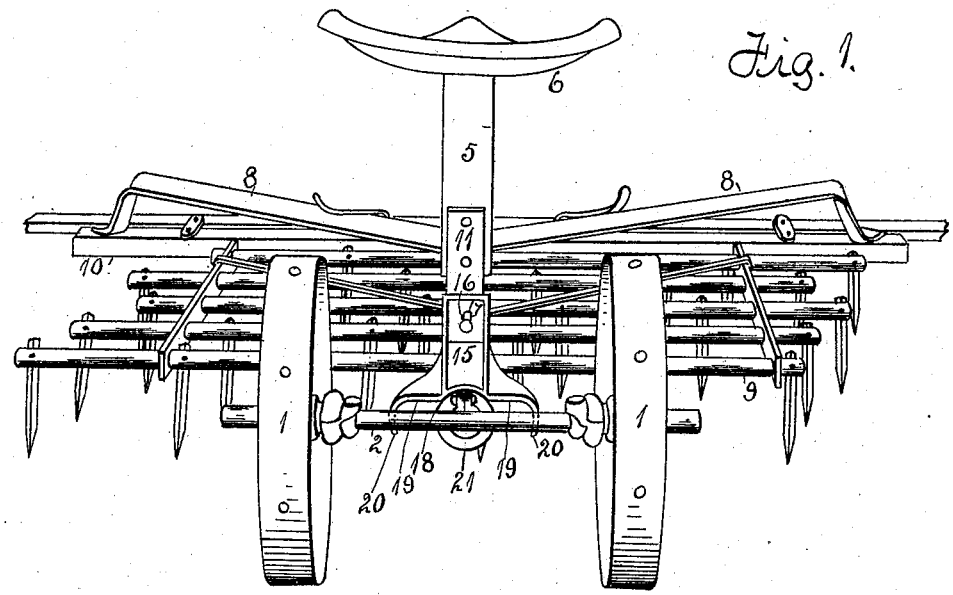
Figure 2:
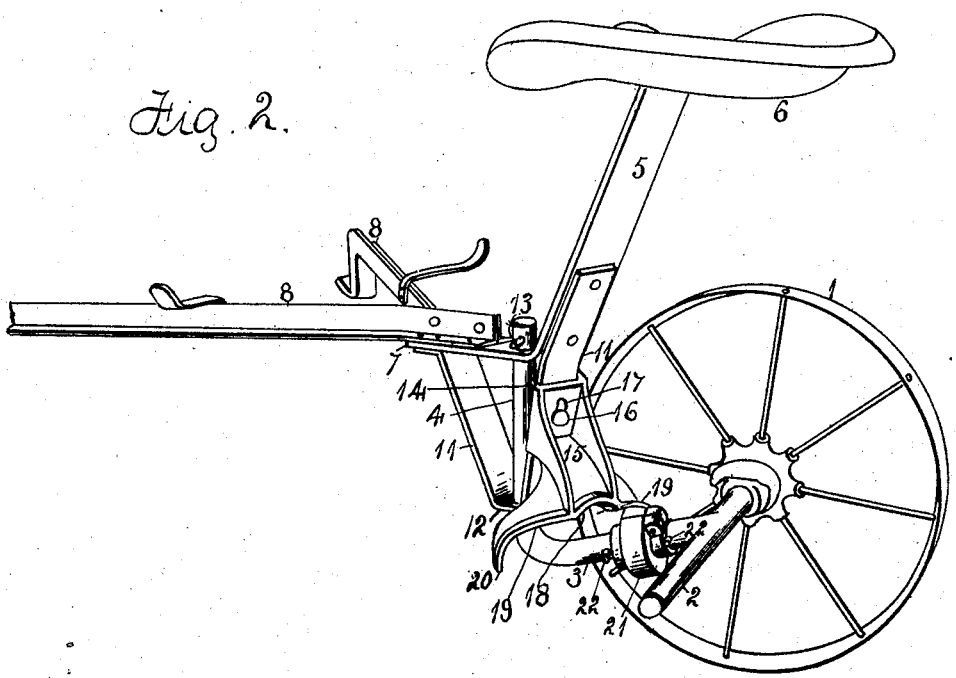

In the accompanying drawings, Figure 1 is a perspective view of my improved riding attachment in connection with a harrow. Fig. 2 is a perspective view of the riding attachment with one wheel removed and the wheel-frame turned in connection with the seat-supporting frame.

The wheels 1 support an axle 2 and are so connected thereto as to permit them to revolve thereon. From the forward portion of the axle and at about the center of its length extends an arm 3, having an upturned section 4.

The seat-supporting frame comprises the bar 5, to the upper end of which is secured the seat 6. To the lower portion 7 of this bar 5 are secured two arms 8, which overspan the harrow 9 and are connected to the evener 10. To the bar 5 and its lower portion 7 is secured a loop composed of the vertical sections 11 and horizontal end 12. The horizontal end has an opening. The upturned section 4 is located in the openings in the horizontal end 12 of the loop and lower portion 7 of the bar 5. A pin 13 passes through the upper end of the upturned section 4, above the lower portion 7 of the bar 5. The upturned section 4, in its connection with the seat-supporting frame, permits the wheel-frame to caster in either direction, the upturned section acting as a pivot.

To the bar 11 is secured a bracket 15, having one face 14 grooved to receive the bar. A bolt 16 passes through a slot 17 in the bracket and also through the bar. The slot 17 permits an adjustment of the bracket in the lengthwise direction of the bar 11. The overhanging portion of the bracket has a concave recess 18 in its under face, and from the bracket each side of the recess extend two wings 19, having their free ends 20 turned downward.

On the arm 3 is located a roller 21, held in place by the pins 22, passing through the arm, one on each side of the roller. The roller is made in two connected parts in order that they may be placed around the arm. This roller is located beneath the bracket secured to the seat-supporting frame.

When the harrow is in use, the roller 21 will be received in the recess 18 in the bracket, and the weight of the rider, exerting a downward pressure on the bracket, tends to hold the roller in the recess in order that the riding attachment will follow the harrow without lateral movement. In turning a corner, or when it is otherwise necessary to permit the wheel-supporting frame to caster, the roller will pass from the recess 18 into the wings 19, and the depending ends 20 of the wings will prevent the wheel-supporting frame from turning too far.

By means of the slot, the bracket can be raised or lowered to decrease or increase the pressure brought against the roller, so that the wheel-frame may caster more or less freely.

I claim as my invention—

1. A riding attachment comprising a seat-supporting frame, a wheel-frame adapted to have a caster movement in connection with the seat-supporting frame, and means for retarding the caster movement of the wheel-frame.

2. A riding attachment comprising a seat-supporting frame, a wheel-frame adapted to have a caster movement in connection with the seat-supporting frame, and adjustable means for retarding the caster movement of the wheel-frame.

3. A riding attachment comprising a seat-supporting frame, a wheel-frame adapted to have a caster movement in connection with the seat-supporting frame, and means for retarding and limiting the caster movement of the wheel-frame.

4. A riding attachment comprising a seat-supporting frame, a wheel-frame, a bracket carried by one of the frames and a roller carried by the other frame, said bracket and roller resting in contact.

5. A riding attachment comprising a seat-supporting frame, a wheel-frame, a bracket carried by one of the frames and having a recess in its face, and a roller carried by the other frame, said roller resting in the recess.

6. A riding attachment comprising a seat-supporting frame, a wheel-frame, a bracket carried by one of the frames and having laterally-turned ends, and a roller carried by the other frame, said bracket and roller resting in contact.

7. A riding attachment comprising a seat-supporting frame, a wheel-frame, a bracket carried by the seat-supporting frame, and a roller carried by the wheel-frame upon which the bracket rests.

8. A riding attachment comprising a seat-supporting frame, a wheel-frame, a bracket carried by the seat-supporting frame and having a recess in its under face, and a roller carried by the wheel-frame adapted to be received in the recess.

9. A riding attachment comprising a seat-supporting frame, a wheel-frame, a bracket carried by the seat-supporting frame, having a recess in its under face and provided with two side wings, and a roller carried by the wheel-frame adapted to be received in the recess or ride against the wings.

10. A riding attachment comprising a seat-supporting frame, a wheel-frame, a bracket carried by the seat-supporting frame, having a recess in its under face and provided with two side wings each having a depending end, and a roller carried by the wheel-frame adapted to be received in the recess or ride against the wings, the depending ends of the wings forming stops to the movement of the roller.

11. A riding attachment comprising a seat-supporting frame, a wheel-frame, a bracket carried by the seat-supporting frame and having two laterally-extending wings, and a roller carried by the wheel-frame upon which the wings of the bracket rest.

12. A riding attachment comprising a seat-supporting frame, a wheel-frame, a bracket carried by the seat-supporting frame, and having two laterally-extending wings with downturned ends, and a roller carried by the wheel-frame upon which the wings of the bracket rest.

13. A riding attachment comprising a seat-supporting frame, a wheel-frame, a bracket carried by the seat-supporting frame and made adjustable toward and from the wheel-frame, and a roller carried by the wheel-frame upon which the bracket rests.

14. A riding attachment comprising a seat-supporting frame, a wheel-frame, a bracket carried by the seat-supporting frame, and a two-part roller carried by the wheel-frame upon which the bracket rests.

LEWIS E. WATERMAN.

Witnesses:
A. O. BEHEL,
E. BEHEL.